United States Patent
Yuan et al.

(10) Patent No.: US 8,418,036 B2
(45) Date of Patent: Apr. 9, 2013

(54) METHOD AND APPARATUS FOR PERFORMING FORWARD ERROR CORRECTION IN AN ORTHOGONAL FREQUENCY DIVISION MULTIPLEXED COMMUNICATION NETWORK

(75) Inventors: Shaw Yuan, San Diego, CA (US); Arndt Mueller, San Diego, CA (US)

(73) Assignee: Entropic Communications, Inc., San Diego, CA (US)

(*) Notice: Subject to any disclaimer, the term of this patent is extended or adjusted under 35 U.S.C. 154(b) by 728 days.

(21) Appl. No.: 12/581,063

(22) Filed: Oct. 16, 2009

(65) Prior Publication Data

US 2010/0100795 A1 Apr. 22, 2010

Related U.S. Application Data

(60) Provisional application No. 61/105,942, filed on Oct. 16, 2008, provisional application No. 61/144,061, filed on Jan. 12, 2009.

(51) Int. Cl.
*H03M 13/00* (2006.01)
(52) U.S. Cl.
USPC ........... 714/776; 714/752; 714/790; 375/267; 375/285; 375/296; 370/392
(58) Field of Classification Search .................. 714/776, 714/752, 790; 375/267, 285, 296; 370/392; 455/23
See application file for complete search history.

(56) References Cited

U.S. PATENT DOCUMENTS

| | | | |
|---|---|---|---|
| 5,349,582 A | 9/1994 | Bisdikian et al. | |
| 6,956,865 B1 | 10/2005 | Khaunte et al. | |
| 7,054,296 B1 | 5/2006 | Sorrells et al. | |
| 2002/0102940 A1* | 8/2002 | Bohnke et al. | 455/23 |
| 2005/0287964 A1 | 12/2005 | Tanaka et al. | |
| 2006/0023717 A1* | 2/2006 | Trachtman et al. | 370/392 |
| 2006/0107169 A1* | 5/2006 | Vedantham et al. | 714/752 |

(Continued)

FOREIGN PATENT DOCUMENTS

WO 2008/039951 A1 4/2008

OTHER PUBLICATIONS

Lakkis, "mmWave OFDM Physical Layer Proposal", Nov. 12, 2006, IEEE, pp. 1-75.*

(Continued)

*Primary Examiner* — Scott Baderman
*Assistant Examiner* — Jeison C Arcos
(74) *Attorney, Agent, or Firm* — Bruce Greenhaus; Sheppard, Mullin, Richter & Hampton LLP

(57) ABSTRACT

According to some embodiments of the disclosed method and apparatus, systems and methods are provided that utilize extra payload capacity present in a symbol pad of a PHY payload to decrease the coding rate of an FEC coding scheme without increasing the symbol rate or decreasing the PHY rate of a corresponding data transmission. If a symbol pad length that would result from encoding a MAC frame using a default coding scheme would be at least as great as a parity length of the default coding scheme, and a new coding scheme maintaining the same parity length but having a reduced information bit length may be determined and used to encode the MAC frame. Owing the reduced information bit length, the new coding scheme has a reduced coding rate, but maintains the same number of OFDM symbols as the default coding scheme.

20 Claims, 9 Drawing Sheets

U.S. PATENT DOCUMENTS

| | | | |
|---|---|---|---|
| 2007/0133386 A1 | 6/2007 | Kim et al. | |
| 2007/0143655 A1* | 6/2007 | Niu et al. | 714/752 |
| 2007/0211810 A1* | 9/2007 | Bohnke et al. | 375/260 |
| 2008/0013473 A1 | 1/2008 | Proctor, Jr. et al. | |
| 2008/0076432 A1 | 3/2008 | Senarath et al. | |
| 2008/0175265 A1* | 7/2008 | Yonge et al. | 370/447 |
| 2009/0089535 A1* | 4/2009 | Lohmar et al. | 711/173 |
| 2009/0254794 A1* | 10/2009 | Malik et al. | 714/776 |

OTHER PUBLICATIONS

Li, "RTP Payload Format for Generic Forward Error Correction", Dec. 2007, Network Working Group, pp. 1-45.*

IEEE, "Media access control frame structure", Mar. 2005, IEEE, pp. 1-10.*

Roca, "Low Density Parity Check (LDPC) Staircase and Triangle Forward Error Correction (FEC) Schemes" Jun. 2008, Network Working Group, pp. 1-34.*

Sankarasubramaniam, "Energy Efficiency based Packet Size Optimization in Wireless Sensor Networks", 2003, IEEE, pp. 1-8.*

Perkins, "A Survey of Packet loss Recovery Techniques for Streaming Audio", 1998, IEEE, pp. 40-48.*

* cited by examiner

METHOD AND APPARATUS FOR PERFORMING FORWARD ERROR CORRECTION IN AN ORTHOGONAL FREQUENCY DIVISION MULTIPLEXED COMMUNICATION NETWORK

CROSS-REFERENCE TO RELATED APPLICATIONS

This application claims priority from Provisional Application Ser. No. 61/105,942, filed on Oct. 16, 2008 and this application claims priority from Provisional Application Ser. No. 61/144,061, filed on Jan. 12, 2009, each which is hereby incorporated herein by reference in its entirety.

TECHNICAL FIELD

The disclosed method and apparatus relates generally to communication networks, and more particularly, some embodiments relate to forward error correction in orthogonal frequency division multiplexed networks.

DESCRIPTION OF THE RELATED ART

Devices are being introduced in both the consumer and commercial sectors with advanced, high bandwidth communications capabilities. Additionally, advances in processing power and low-power consumption technologies have led to the widespread proliferation of communications capabilities in various products. For example, communication networks are now commonplace in many home and office environments. Such networks allow various previously independent devices to share data to enhance productivity or simply to make them more convenience to use.

In light of this, there is a growing need to connect devices, including content devices (e.g., DVD players and recorders, digital cameras, video cameras, etc.), computing devices (e.g., laptops, desktops, etc.), I/O devices (e.g., televisions, speakers, music systems, etc.), home appliances (e.g., refrigerators, etc.) and modems (cable modems, telephone modems, etc). One particularly popular home communication network is a home entertainment network. Home entertainment networks typically have one of two topologies. The first is an "Access" topology, which can be best analogized to a tree structure wherein a base node communicates with nodes in its branches, but branch nodes do not typically communicate with other branches. The second is a "Mesh" topology in which any node can communicate with any other node in the network. Access topologies are typically found in apartment or office settings where a master node at the 'source' is used to distribute data to a plurality of downstream nodes (e.g., to the various apartments in an apartment building) and the downstream nodes (e.g., apartments) do not need to share content with one another. Mesh topologies, on the other hand, might be more typically found in a home environment where, although there may be a common source of broadband data (e.g., the main cable feed into the home), the homeowners may wish to share content originating from a device in one room with other devices in other rooms in their home.

To address the growing demand for a digital home networking market, a consortium of industry leading companies formed the Multimedia over Coax Alliance (MoCAT™). MoCA has provided a technical standard (referred to as "MoCA") which defines a Mesh topology protocol for distributing data over the available bandwidth on coaxial cable previously installed in households for cable or satellite TV service. The initial MoCA standard was approved in February 2006, and routers with built-in MoCA capabilities (i.e., that conform to the MoCA standard), MoCA set-top boxes and MoCA adapters followed shortly thereafter.

Many networks, including some Mesh topologies, communicate on the network media using orthogonal frequency division multiplexing (OFDM). When using OFDM, a number of orthogonal frequency subcarriers are used to carry data. The data is divided into several parallel data streams or channels, one for each subcarrier. Each subcarrier is modulated with a conventional modulation scheme (such as quadrature amplitude modulation (QAM) or phase shift keying (PSK)). As an example, a network media might be subdivided into 256 orthogonal frequency subcarriers, and each subcarrier may be modulated with a 1024-QAM symbol, corresponding to 10 bits/symbol. In this network, a single OFDM symbol in this environment could carry (10 bits/QAM symbol)*(256 QAM symbols/OFDM symbol)=2,560 bits/OFDM symbol.

In typical forward error correction (FEC) coding schemes, an "encoding input block," which may comprise the modulation symbols of an input message, are each encoded to form an "encoded output block". The encoded output blocks typically have a longer length than the encoding input block. In one particular FEC coding scheme, the encoding input blocks are required to each have a predetermined length. In accordance with one commonly used notation, an (X,Y) FEC coding scheme receives encoding input blocks of length X to form encoded output blocks of length Y. In one such embodiment, the difference between the length of each encoded output block and the length of each encoding input block (i.e., Y-X) is referred to as the number of parity bits that the particular FEC coding scheme adds to each encoding input block.

In typical network transmissions, a physical layer (PHY) protocol receives a media access control (MAC) frame and is tasked with modulating the frame for transmission on the media. In some OFDM networks, the PHY layer will perform FEC encoding on the MAC frame, and then modulate the encoded MAC frame onto an OFDM symbol. MAC frames will often have lengths that are not an integer multiple of the encoding input block length of the FEC coding scheme. This creates a problem, since typical encoding schemes are not configured to encode input blocks that are either shorter or longer in length than an encoding input block. For example, if a PHY layer uses a (10,12) FEC coding scheme (i.e., the encoding input block length is 10), then a MAC frame that is 43 bits long can be divided into 4 encoding input blocks (each of length 10) with 3 bits left over. The FEC coding scheme is unable to encode a 3 bit message.

To solve this problem, a PHY layer will typically perform "FEC padding." FEC padding involves adding additional bits (i.e., 7 additional bits in this example) to make it possible to divide the MAC frame into an integer number of encoding input blocks (i.e., 5 10-bit encoding input blocks in this example). The value of the padding bits can be either arbitrarily chosen or chosen according to some predetermined method. For the purposes of this description, the encoded output blocks that are output from the FEC coding scheme in response to an input MAC frame will be referred to as an FEC encoded MAC frame.

When an FEC encoded MAC frame is to be mapped into an OFDM symbol, the FEC encoded MAC frame may not have a length that is an integer multiple of the number of bits per OFDM symbol. Accordingly, the FEC encoded MAC frame is further "OFDM symbol padded" with an "OFDM symbol pad" so that the encoded MAC frame plus the OFDM symbol pad occupy all of the allocated bits of the OFDM symbol for data transmission. This process of FEC padding, FEC encoding, OFDM symbol padding, and OFDM symbol modulation is illustrated in FIG. 1. In some networks, particularly networks having a large number of bits per symbol, the symbol pad length can be quite large. The result is a relatively inefficient transmission scheme. Accordingly, there is a need for a more efficient way to perform FEC encoding and OFDM symbol encoding.

BRIEF SUMMARY

According to some embodiments of the disclosed method and apparatus, systems and methods are provided that decrease the coding rate of an FEC coding scheme (i.e., reduce the size of each encoded output block) in order to reduce the size of the OFMD symbol pad. If a symbol pad length that would result from encoding a MAC frame using a default coding scheme would be at least as great as a parity length of the default coding scheme, and a new coding scheme maintaining the same parity length but having a reduced information bit length may be determined and used to encode the MAC frame. Owing the reduced information bit length, the new coding scheme has a reduced coding rate, but maintains the same number of OFDM symbols as the default coding scheme.

According to various embodiments of the disclosed method and apparatus, data bits that would otherwise be used in a symbol pad or in an FEC pad are used to increase the error correction capabilities of a forward error correction (FEC) code used to encode a MAC frame. A number of network devices communicating on a network media are provided with a default FEC coding scheme. If the length of a symbol pad that would be used by coding the next frame using the default FEC coding scheme is at least as great as the parity bit length of the default FEC coding scheme then the transmitting device determines a new FEC coding scheme for data transmission. If the MAC frame has a length that is known to the receiving device, the transmitting device determines a new FEC coding scheme having the same parity bit length of the default FEC coding scheme, but having a reduced information bit length, where the new FEC coding scheme is configured such that the symbol pad resulting from using the new FEC coding scheme is not longer than the parity bit length. If the next frame has a length that is not known to the receiving device, the transmitting device determines a new FEC coding scheme having the same parity bit length but having a reduced information bit length configured such that the new coding scheme encodes the MAC frame using an additional encoded output block as compared to what would be used under the default coding scheme.

According to an embodiment of the disclosed method and apparatus, a method for a transmitting network device to encode data for transmission on a network to a receiving network device, comprises obtaining a MAC frame scheduled for transmission and having a MAC frame length; determining a number of required OFDM symbols and a symbol pad length that would result from coding the MAC frame using a default FEC coding scheme, wherein a default FEC encoded output block of the default FEC coding scheme has a default parity length and a default information bit length; if the default symbol pad length is at least as great as the default parity length, determining a new FEC coding scheme that maintains the number of required OFDM symbols and reduces the symbol pad length; and encoding the MAC frame using the new FEC coding scheme.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict typical or example embodiments of the disclosed method and apparatus. These drawings are provided to facilitate the reader's understanding of the disclosed method and apparatus and shall not be considered limiting of the breadth, scope, or applicability of the disclosed method and apparatus. It should be noted that for clarity and ease of illustration these drawings are not necessarily made to scale.

Figure 1:
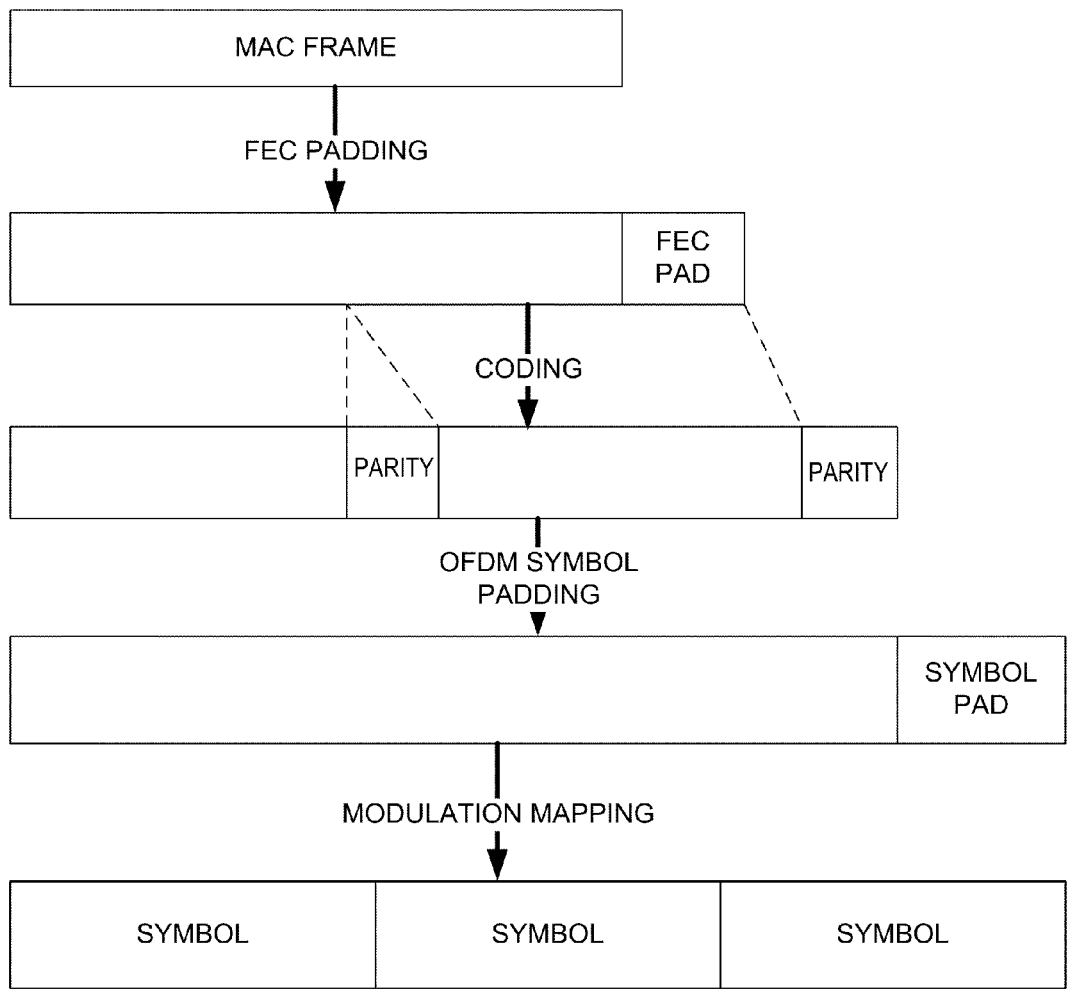
FIG. 1 illustrates typical code padding, coding, symbol padding, and symbol modulation in some communication networks.
Figure 2:
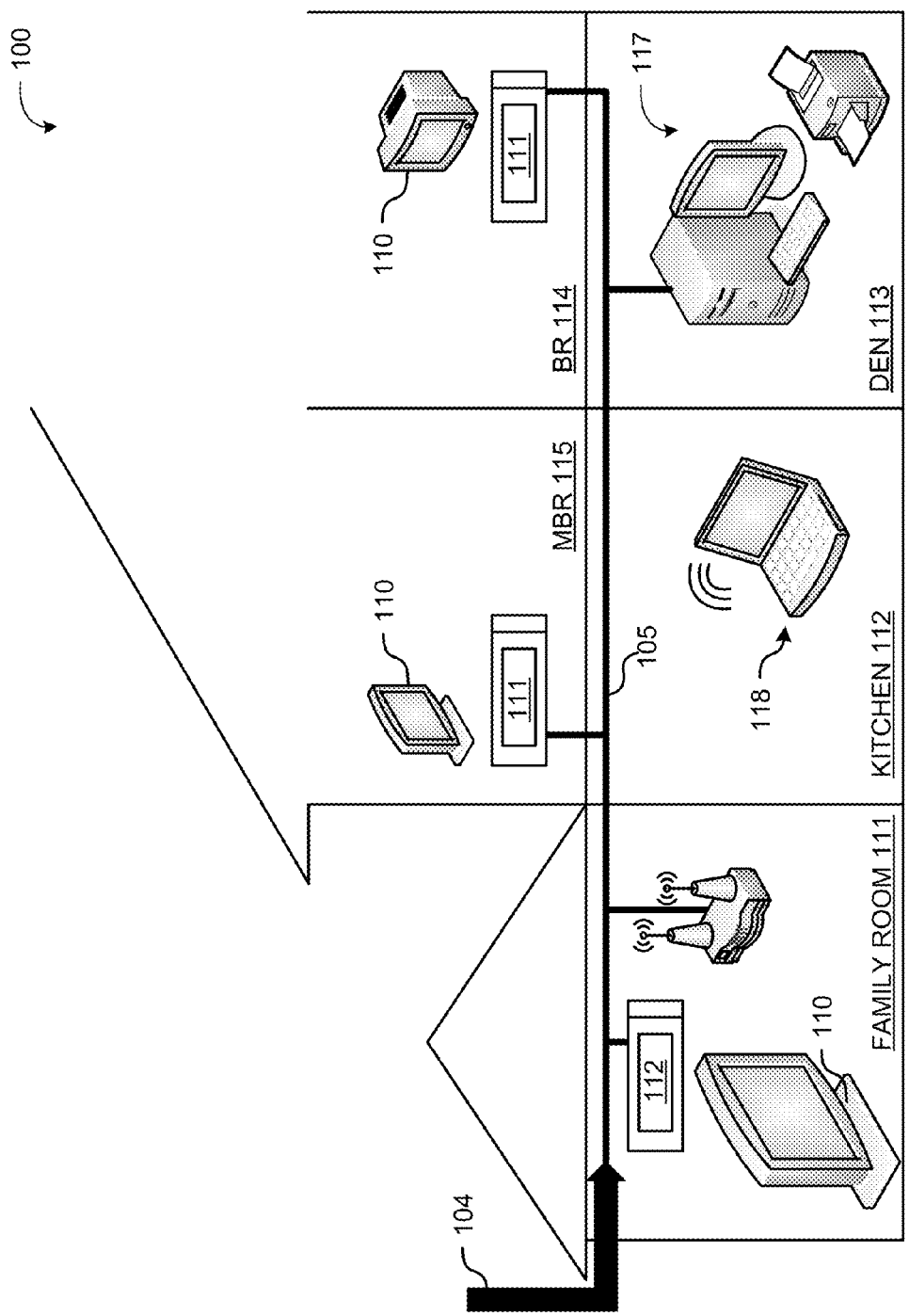
FIG. 2 illustrates an embodiment of the disclosed method and apparatus deployed in an example network environment.

The figures are not intended to be exhaustive or to limit the disclosed method and apparatus to the precise form disclosed. It should be understood that the disclosed method and apparatus can be practiced with modification and alteration, and that the disclosed method and apparatus be limited only by the claims and the equivalents thereof.

DETAILED DESCRIPTION

In accordance with one embodiment of the disclosed method and apparatus, a Mesh topology is used in which nodes communicate with one another. The PHY layer of each node uses OFDM to modulate data onto a plurality of available frequency subcarriers. Alternatively, OFDMA may be used in which case a subset of the available subcarriers comprise a channel. According to one embodiment, a stream of data to be transmitted is divided into a number of subcarrier streams, the number of streams being equal to the number of subcarriers to be used as a channel. Each subcarrier stream is modulated onto the respective subcarrier using a modulation such as BPSK, QPSK, QAM, etc. Each subcarrier stream can be modulated with a different number of bits per subcarrier symbol. For example, some subcarriers may be modulated with 1 bit per subcarrier symbol (BPSK), while other subcarriers may be modulated with 10 bits per subcarrier symbol (1024-QAM) or with even larger constellations. In further embodiments, the modulation profiles (i.e., the particular modulation selected for each subcarrier) may vary depending upon which particular pairs of nodes on the network are communicating. Accordingly, in some embodiments, a period of modulation profiling is performed to select the modulation profile to be used with each particular pair of nodes. In these embodiments, the number of bits per OFDM symbol may very between nodes, and may also vary as the network configuration changes, for example through new network devices being introduced.

In various embodiments, MAC frames are encoded by the PHY layer using a forward error correction (FEC) coding scheme prior to modulation onto the OFDM or OFDMA symbol. In one particular embodiment, low-density parity-check (LDPC) codes are used. As used herein, a (kLDPC, nLDPC) coding scheme refers to a LDPC coding scheme where the encoding input block is kLDPC bits long and encoded output block is nLDPC bits long. The number of parity bits (nLDPC-kLDPC) of such a coding scheme is referred to as having "Nparity".

In some embodiments, a default FEC coding scheme is provided having a default coding scheme length. For example, an LDPC mothercode may be provided having a predetermined native encoded output block size. In a particular embodiment, an LDPC mothercode comprising a (3900, 4600) code. In some embodiment, this mothercode may comprise a default coding scheme for use in network communications. In further embodiments, protocols may be provided that determine various network metrics and these metrics may be used to define a default coding scheme using the mothercode with a reduced information bit length. In some of these embodiments, these default coding schemes may be provided to be used for network-wide communications. In other embodiments, various network devices may be configured to choose reduced default encoded output block lengths that may be used for network communications. For example, in a particular embodiment, a receiving network device is configured to determine a default encoded output block length for use in communications on the link. The receiving device may then provide that default encoded output block length to the transmitting device. As described herein, these default coding schemes may be codes having a maximum allowed encoded output block length for link communications.

Figure 3:
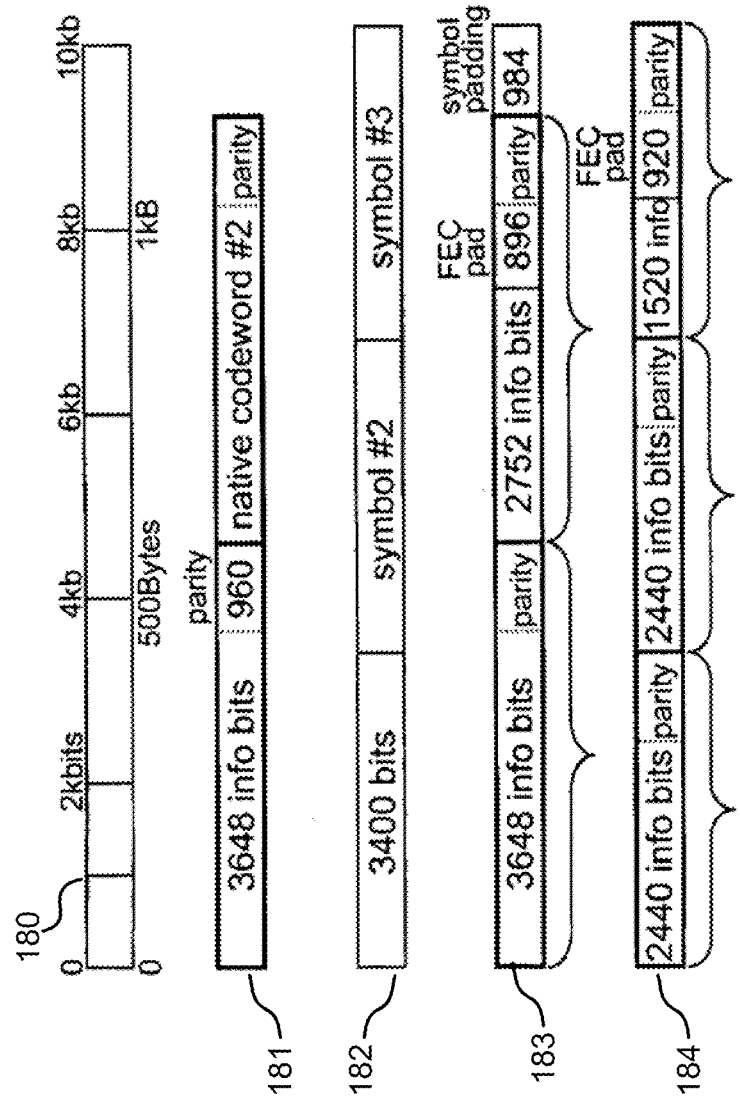
FIG. 3 illustrates an example of using a new coding scheme having a reduced code rate without increasing OFDM symbols when compared to using the default coding scheme according to an embodiment of the disclosed method and apparatus.

As described above, the use of a fixed encoding input block length and fixed encoded output block length will typically result in the need for a FEC pad and a symbol pad. FIG. 3 illustrates an example of one such case using a default (3648, 4608) LDPC coding scheme. In this example, the receiving node does not know the MAC frame size. A scale 180 is provided to demonstrate a bit and byte scale for the various illustrated bit streams. In this example, a bit stream 181 illustrates the bit length for two encoded output blocks of the default coding scheme. As illustrated, each encoded output block has 3648 information bits (i.e., the bit length of the encoding input block) and 960 parity bits (i.e., parity bits=4608−3648=960). In this example, the modulation profile on the network link is such that each OFDM symbol comprises 3400 bits (i.e., the number of subcarriers times the number of bits per subcarrier symbol), as illustrated by stream 182. Accordingly, encoding an information message, such as a MAC frame having an 6400 bit length (ie., 800 bytes), will require 2 encoding input blocks (see stream 183), which will then be modulated onto 3 OFDM symbols. As illustrated by stream 183, mapping this message onto the three OFDM symbols after default encoding with the encoded output block length of 4608 requires two encoded output blocks and a symbol padding of 984 bits.

In accordance with one embodiment of the disclosed method and apparatus, some of the symbol padding can be eliminated (i.e., the number of symbol padding bits needed can be reduced) by decreasing the encoding input block length, while maintaining the same parity length (i.e., decreasing the coding rate, which is defined as the ratio of encoding input block length to encoded output block length). This is illustrated in stream 184, where the symbol padding length was 984 bits long when using the default coding scheme (i.e., LDPC (3648, 4608)). Because the symbol padding length is longer than the parity length of the default coding scheme, a new coding scheme may be generated that has the same parity length but a reduced information bit length. In this situation, a new encoding input block length of 2440 bits results in a (2440, 3400) code, where no symbol padding is required. This code has a rate of 0.72, as compared to the rate of the default coding scheme of 0.79. Accordingly, the (2440, 3400) coding scheme is more robust, but less efficient. Nonetheless, since the reduction in efficiency is offset by the reduction in the number of symbol padding bits require, there is a net gain in the robustness of the FEC coding scheme at no cost in efficiency (i.e., the same number of encoding input block bits are transmitted in the three OFDM symbols with a lower more robust coding rate).

As described herein, in some embodiments, different links (i.e., paths between nodes of the network) may have significantly different modulation profiles. Accordingly, the number of bits in an OFMD symbol will typically vary drastically. In these embodiments, the length of the encoding input block of the coding scheme (and thus the length of the encoded output block) may be selected to decrease the code rate for a transmission. This will increase the number of encoded output blocks used to encode a data packet, which in turn, if selected correctly, will reduce the length of the symbol pad that would otherwise be needed.

Figure 4:
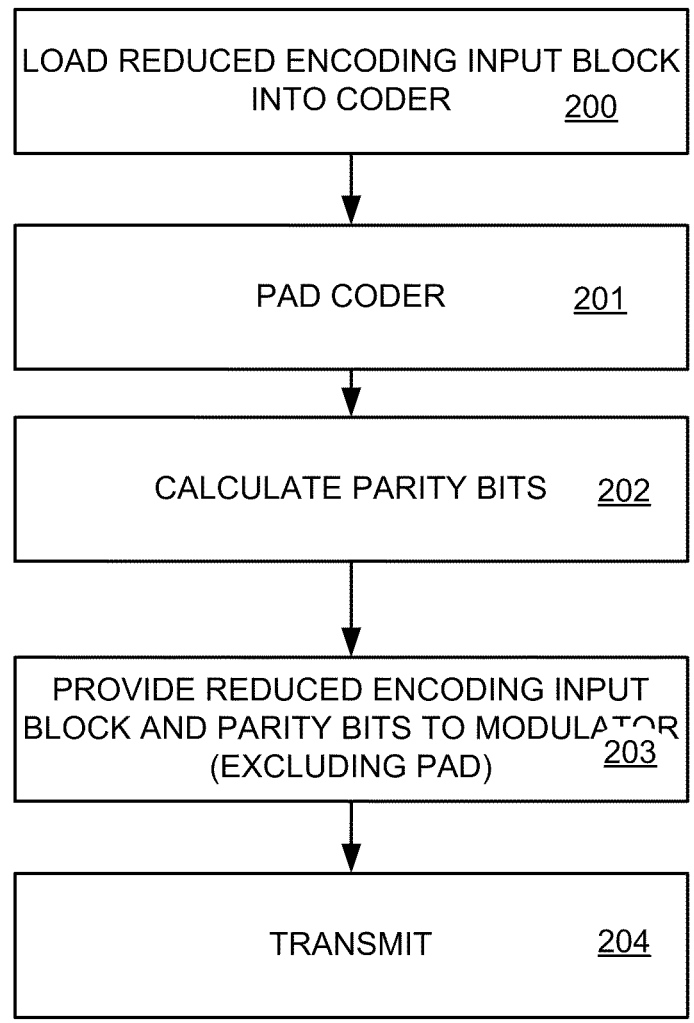
FIG. 4 illustrates a method for data coding using a coder configured for a mothercode code length while reducing the encoding input block length of the code according to an embodiment of the disclosed method and apparatus.

In some embodiments, one default coding module may be used to receive encoding input blocks that are adaptable to shorter lengths than the default and to output an encoded output block having a length that is adaptable to be shorter than the default. FIG. 4 illustrates a method for FEC encoding using a coding module configured for a "mothercode code length" while reducing the encoding input block length of the code implemented in accordance with an embodiment of the disclosed method and apparatus. The mothercode code length is the maximum length for both the encoding input block and the encoded output block.

In accordance with one embodiment of the disclosed method and apparatus, a coding module is preconfigured to take an encoding input block of a default size and output a encoded output block comprising the encoding input block and a parity block. In this embodiment, a new coding scheme is determined according to the methods described herein. This new coding scheme has encoded output blocks with the same parity length as the encoded output blocks of the default coding scheme, but with a reduced encoding input block length. Accordingly, the length of the encoded output block is shorter as well. The same coding module used in the default coding scheme may be employed by loading the reduced length encoding input block into the coding module (STEP 200), and then adding fill bits to the coder (STEP 201) to make up the expected difference. For example, strings of digital 1s or 0s may be used to fill the coding module. In the above example, with the new coding scheme (2440, 3400) derived from the default coding scheme (3648, 4608), encoding input blocks of length 2440 bits are loaded into the coding module. The encoding input block of length 2440 is filled with a string of 1s having an length of 1208 bits (2440+1208=3648) to get to the default length of 3648 bits. The filled encoding input block is provided to the coding module. After filling the coding module, the parity bits for the code (STEP 202) are calculated in the coding module. Accordingly, the number of parity bits remains the same between the default coding scheme and newly generated coding scheme. After generating the parity bits, the fill bits are extracted, and the reduced encoding input block and parity bits may be modulated (STEP 203) and transmitted (STEP 204).

Figure 5:
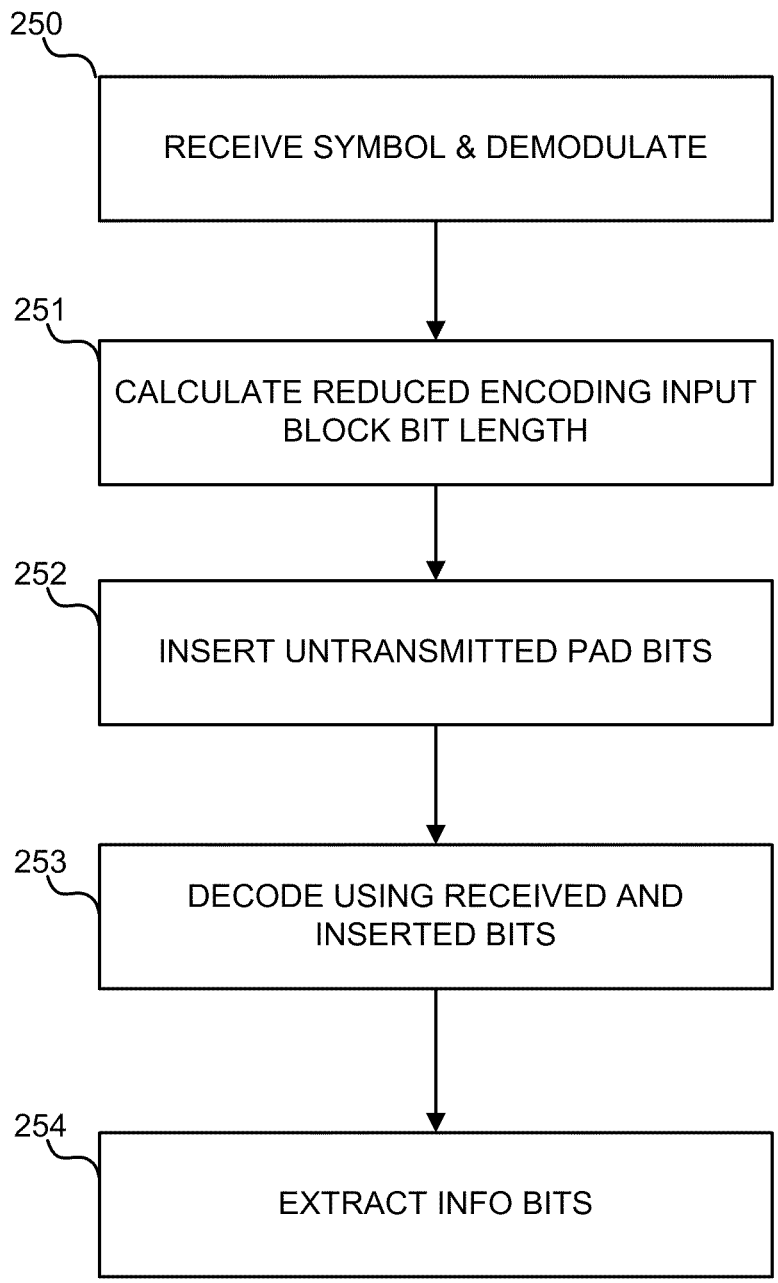
FIG. 5 illustrates a method for decoding data encoded according the method illustrated in FIG. 4, in accordance with an embodiment of the disclosed method and apparatus.

A method for data reception and decoding corresponding to the transmission method of FIG. 4 is described with respect to FIG. 5. In this embodiment, the receiver is aware that a coding scheme other than the coding scheme using the mothercode code length was used to encode the transmitted message. In addition, the receiver is made aware of that coding scheme's code length. For example, the coding scheme may comprise a default coding scheme for the link in which the encoding input block is shorter, or a new coding scheme determined as described herein. In the illustrated decoder, the receiver receives and demodulates (STEP 250) the symbol transmitted by the transmitting network device. The receiver further calculates (STEP 251) (or otherwise obtains) the encoding input block bit length of the new coding scheme. Using this information, the receiver is able to determine the number of fill bits used by the transmitter during transmission. Accordingly, the receiver inserts (STEP 252) these untransmitted fill bits into the stream, and decodes the resulting block (STEP 253). Once the block is decoded, the receiver is able to extract the information (STEP 254) by discarding the inserted fill bits.

Figure 6:
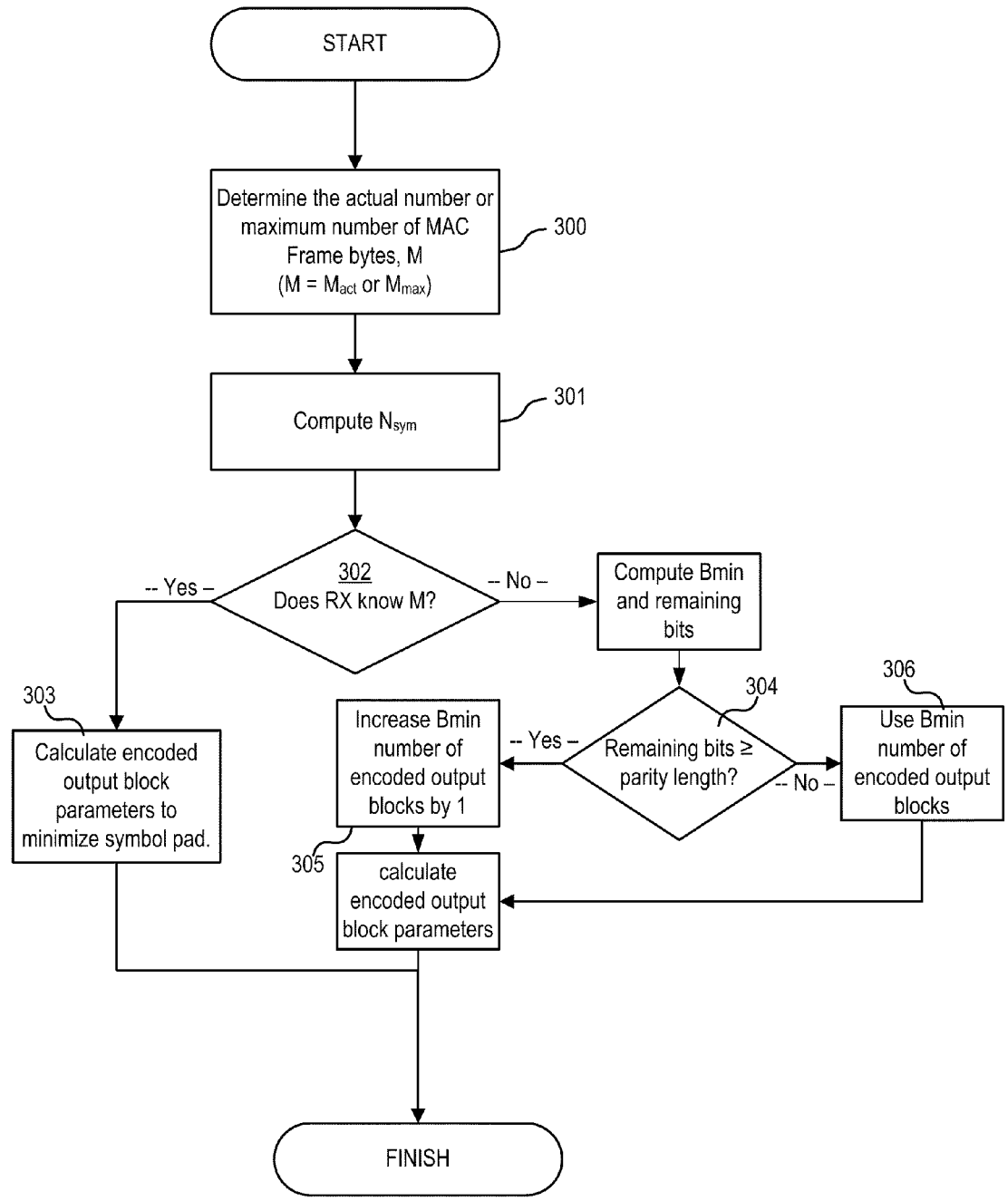
FIG. 6 illustrates a method for generating a new coding scheme from a default coding scheme according to an embodiment of the disclosed method and apparatus.

FIG. 6 illustrates a method for generating a new coding scheme from a default coding scheme according to an embodiment of the disclosed method and apparatus. In some network environments and in some situation, the scheduling for a MAC frame may take place before the MAC frame is actually generated. For example, if a network device is streaming real-time generated data (such as VOIP call or a digitized television signal) to another network device, the actual MAC frame length may be determined after the transmitter schedules its transmission. In such an embodiment, a transmitting device will often request a maximum MAC frame length to ensure that the actual frame will fit within the scheduled bandwidth. In some embodiments, a new encoded output block length may be generated in the context of the scheduling period, and may therefore be generated before an actual MAC frame is presented to the PHY layer. For example, in the embodiment illustrated in FIG. 6, the transmitting network device determines either the actual number, or the maximum number, of MAC frame bytes, M, (STEP 300) according to whether the frame length is predetermined or prospective. The device then computes the number of OFDM symbols, $N_{sym}$, required to transmit a MAC frame of length M, assuming the default mothercode is used in coding. In this embodiment, the default coding scheme also represents the maximum code length that may be utilized; accordingly, $N_{sym}$ represents the number of OFDM symbols that will be used even if a new coding scheme is generated.

As described herein, methods of generating a new coding scheme for use in encoding a MAC frame onto a PHY payload may take use bits that would otherwise result in symbol padding or FEC code padding to make the FEC coding more robust. Accordingly, in these embodiments, the transmitting network device may be configured to determined payload capacity values that can be used to determine whether a new coding scheme may be generated for the transmission. In various embodiments, different payload capacity value types may be used in different circumstances. In some embodiments, if the receiving device will know a MAC frame length before it is transmitted, the payload capacity value may comprise a default symbol pad length that would be used if the MAC frame were coded using the default coding scheme. In other embodiments, if the receiving device will not know the MAC frame length before it is transmitted, then payload capacity value may comprise a remainder value comprising the difference between the total number of transmitted bits in the payload and the minimum number of encoded output blocks times the default coding scheme length.

In the illustrated embodiment, the transmitter determines (STEP 302), if the receiver will have information regarding the MAC frame length M. For example, in this embodiment, the receiver may not receive a separate indication of the new encoded output block length, other than what it can calculate on its own. If the receiver does have knowledge of M before decoding the transmitted message, then the receiver can perform similar calculations to those of the transmitter, and therefore determine the encoded output block length that minimizes the symbol pad length. Accordingly, the transmitter can calculate 303 and use a new coding scheme that has a encoded output block length that minimizes the required symbol pad, as described herein.

In this embodiment, if the receiver does not know M, then the receiver cannot determine the specific encoded output block length that maximizes the reduction of the symbol pad length. However in this embodiment, the receiver has knowledge of the bit loading determined by the modulation profile of the link, and has knowledge of the number of OFDM symbols reserved during the scheduling period. Accordingly, the receiver can determine the encoded output block parameters 308 used by the transmitter given that both use the same set of rules. The receiver can determine 307 the minimum number of code words $B_{min}$, useable to encode a MAC frame transmitted over the scheduled OFDM symbols. This minimum number may be calculated by taking the floor of the total number bits transmitted in the scheduled OFDM symbols divided by the length of the default encoded output block. The receiver can further determine the remaining bits as the difference between the total number of transmitted bits and the minimum number of code words times the default coding scheme length. Accordingly, if this remainder is at least as great as the parity length of the default coding scheme (STEP 304), then the transmitter can increase (STEP 305) the minimum number of encoded output blocks by 1 to use a new coding scheme (STEP 308) having a code length configured to allow one more encoded output block than would be generated using the default coding scheme. In contrast, if the remainder is less than the parity length of the default coding scheme, then the transmitter uses (STEP 306) the $B_{min}$ number of default encoded output blocks to generate encoded output block parameters (STEP 308) to encode the message using the default coding scheme.

Figure 7:
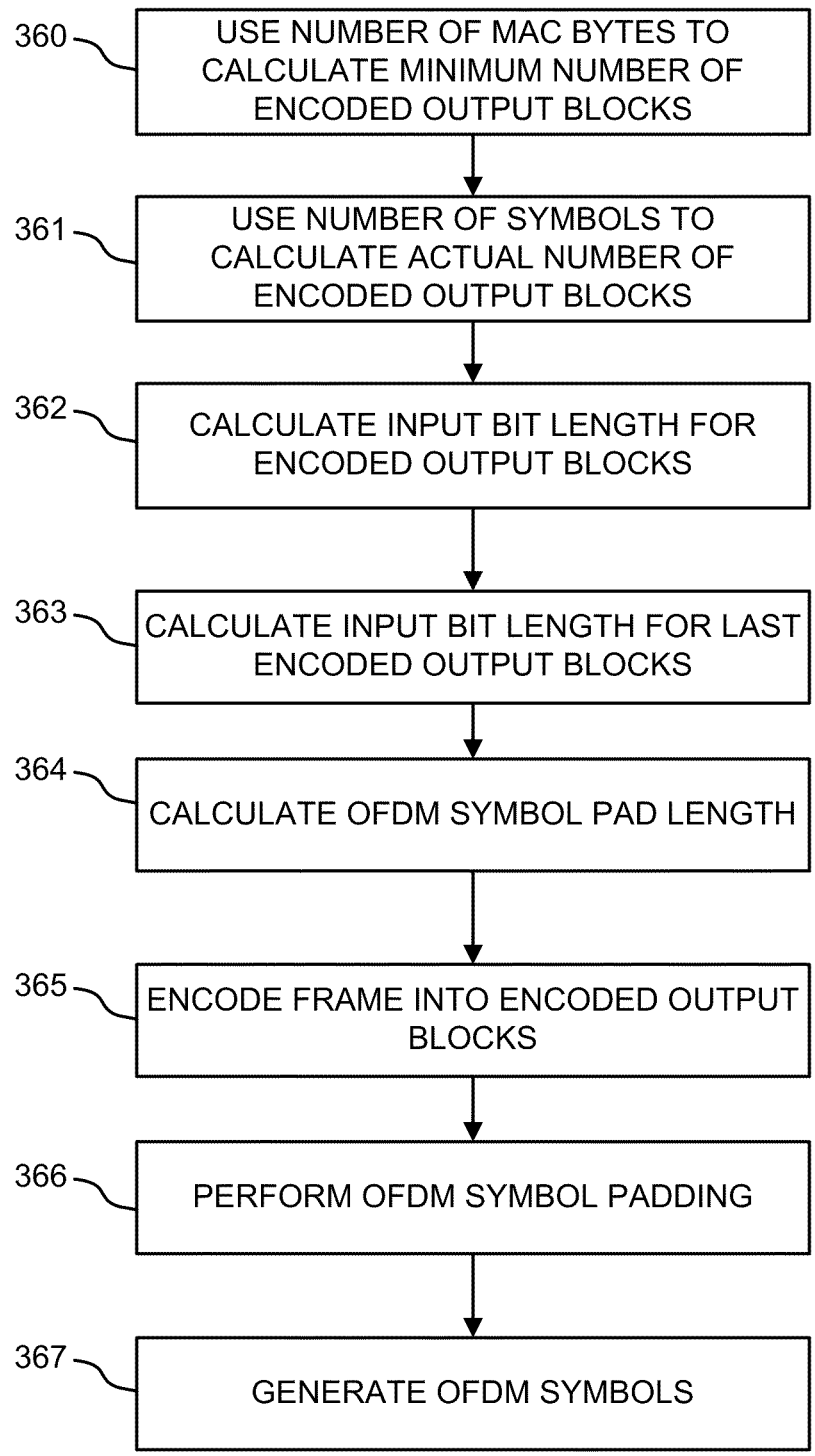
FIG. 7 illustrates a method for determining a new coding scheme when the receiving device has knowledge of the MAC frame length according to an embodiment of the disclosed method and apparatus.

FIG. 7 illustrates a method for determining a new coding scheme when the receiving device has knowledge of the MAC frame length according to an embodiment of the disclosed method and apparatus. In some embodiments, because both the transmitter and the receiver know the MAC frame length, they may perform the calculation steps independently and derive the same code length. Accordingly, although FIG. 7 is described from the viewpoint of the transmitting network device, the receiving device may perform equivalent calculations.

In this method, the length of the MAC frame is used (STEP 360) to determine the minimum number of encoded output blocks required to encode the MAC frame. The MAC frame is assumed for the example below to be in bytes having a length of 8 bits. However, this can be generalized to input data organized in any fashion. For example, this minimum number of encoded output blocks may comprise the number of encoded output blocks that would be used in encoding the MAC frame using the default coding scheme. In a particular embodiment employing LDPC, this minimum number of encoded output blocks, $B_{min}$, may be computed as $$B_{min} = \left\lceil \frac{M \times 8}{kLDPC_{max}} \right\rceil$$

where $kLDPC_{max}$ is the maximum allowed information bit length. In some embodiments, for example those not employing a link specific maximum code length, $kLDPC_{max}$ might comprise the information bit length of the mother code. In other embodiments, for example those employing link specific maximum code lengths, $kLDPC_{max}$ might comprise the information bit length of a default coding scheme that is generated according to minimum acceptable bit error rates according to the specific link characteristics.

In this embodiment, the transmitter knows, and the receiver can determine, the number of OFDM symbols that will be used for the transmission. Accordingly, given the number of OFDM symbols, a new number of encoded output blocks is calculated (STEP 362) to increase the number of encoded output blocks for a new coding scheme having a reduced information bit length. For example, in the LDPC embodiment described above, this calculated number of new encoded output blocks, $B_{LDPC}$, is equal to:

$$B_{LDPC} = B_{min} + \left\lfloor \frac{N_{SYM} \times N_{BAS} - M \times 8 - B_{min} \times Nparity}{Nparity} \right\rfloor$$

$$B_{LDPC} = \min(B_{LDPC}, N_{SYM})$$

where $N_{BAS}$ is the number of bits per OFDM symbol and Nparity is the number of parity bits in the LDPC mother code.

In this embodiment, after the number of new encoded output blocks is calculated, the information bit length for the new coding scheme is determined (STEP 362 and 363). In some embodiments, the encoding input block length requirements may necessitate FEC padding for the final encoded output blocks of a coded MAC frame. For example, this is illustrated in case 164 of FIG. 3. In some embodiments, the information bit length for the new coding scheme may be constrained by various parameters. For example, in a particular embodiment, employing a link derived maximum information bit length, the new coding scheme cannot have information bit lengths longer than this maximum. Furthermore, some embodiments, the decoder may have processing capabilities such that decoding may require approximately the same time as required to receive a symbol. Accordingly, to avoid the introduction of latency, the new coding scheme must have encoded output blocks greater than the length of a symbol. In this embodiment, the information bit length of the new coding scheme is determined under this constraint. In this embodiment, the new coding scheme for all but the last encoded output blocks may be encoded using an (kLDPC, nLDPC) code where kLDPC and nLDPC are computed as follows.

$$kLDPC_{target} = 8 \times \left\lceil \frac{M}{B_{LDPC}} \right\rceil$$

$$kLDPC = \begin{cases} kLDPC_{max} & \text{if } kLDPC_{target} > kLDPC_{max} \\ N_{BAS} - Nparity & \text{if } (kLDPC_{target} + Nparity) < N_{BAS} \\ kLDPC_{target} & \text{otherwise} \end{cases}$$

$$nLDPC = kLDPC + Nparity$$

In this embodiment, the last encoded output block of the MAC frame may be encoded using a $(kLDPC_{last}, nLDPC_{last})$ code where $kLDPC_{last}$ and $nLDPC_{last}$ are computed as follows:

$$kLDPC_{last} = 8 \times M - (B_{LDPC} - 1) \times kLDPC$$

$$nLDPC_{last} = kLDPC_{last} + Nparity$$

In some embodiments, the use of a separate new coding scheme for the last encoded output block eliminates the need for an FEC pad. In other embodiments, a single new coding scheme may be used for all the encoded output blocks, and an FEC pad may be generated accordingly.

In the illustrated embodiment, after the new coding scheme is generated, a new, reduced, symbol pad length, $N_{OFDM}$, may be calculated 364 for use in modulating the symbol as follows:

$$N_{OFDMpad} = \lceil (N_{sym} \times N_{BAS} - (B_{LDPC} - 1) \times nLDPC - nLDPC_{last})/8 \rceil$$

If there is any remainder after the division by 8, then $N_{OFDMpad}$ is rounded up. However, if the last byte of the pad doesn't fit completely in the OFDM symbol, then those extra bits are discarded. In some embodiments utilizing OFDMA, transmitting network devices may be provided with bandwidth multiplier values, ni, as described above. In these embodiments, the method and equations described with respect to FIG. 8 may be modified as follows. In this embodiment, the minimum number of encoded output blocks, $B_{min}$, may be computed as:

$$B_{min} = ni \times \left\lceil \frac{M \times 8}{ni \times kLDPC_{max}} \right\rceil$$

where ni is a bandwidth multiplier for use in OFDMA communications. In the OFDMA case, the calculated number of new encoded output blocks, $B_{LDPC}$, is equal to:

$$B_{LDPC} = B_{min} + ni \times \left\lfloor \frac{N_{SYM} \times N_{BAS} - M \times 8 - B_{min} \times Nparity}{ni \times Nparity} \right\rfloor$$

$$B_{LDPC} = \min(B_{LDPC}, ni \times N_{SYM})$$

With the construction of ni described above, in these embodiments $N_{BAS}$ will be an integer multiple of ni. Rather than having a single FEC pad, in embodiments employing OFDMA the final ni encoded output blocks may be encoded using such FEC pads. In these OFDMA cases, the new coding scheme for all but the last ni encoded output blocks may be encoded using an (kLDPC,nLDPC) code where kLDPC and nLDPC are computed as follows.

$$kLDPC_{target} = 8 \times \left\lceil \frac{M}{B_{LDPC}} \right\rceil$$

$$kLDPC = \begin{cases} kLDPC_{max} & \text{if } kLDPC_{target} > kLDPC_{max} \\ N_{BAS}/ni - Nparity & \text{if } ni \times (kLDPC_{target} + Nparity) < N_{BAS} \\ kLDPC_{target} & \text{otherwise} \end{cases}$$

$$nLDPC = kLDPC + Nparity$$

In these embodiments, the last ni encoded output blocks of the MAC frame may be encoded using a (kLDPC$_{last}$,nLDPC$_{last}$) code where kLDPC$_{last}$ and nLDPC$_{last}$ are computed as follows:

$$kLDPC_{last} = \frac{8 \times M - (B_{LDPC} - ni) \times kLDPC}{ni}.$$

$$nLDPC_{last} = kLDPC_{last} + Nparity$$

Finally, the symbol pad length, N$_{OFDM}$, may be calculated as follows:

$$N_{OFDMpad} = \lceil (N_{sym} \times N_{BAS} - (B_{LDPC} - ni) \times nLDPC - ni \times nLDPC_{last})/8 \rceil$$

After these calculations are performed, the transmitting network device can encode the MAC frame (STEP 365) using the new coding scheme, for example as described above with respect to FIG. 4. The encoded MAC frame may then be padded with the calculated symbol pad (STEP 366), and the modulated OFDM symbols (STEP 367) may be generated for further use, for example for transmission to the receiver after preamble insertion. On the receiving device's side, after these calculations are performed, the modulated symbol may be demodulated and the calculated symbol pad discarded. Then, the encoded MAC frame may be decoded using the calculated new encoded output block lengths, for example through the method described with respect to FIG. 5.

Figure 8:
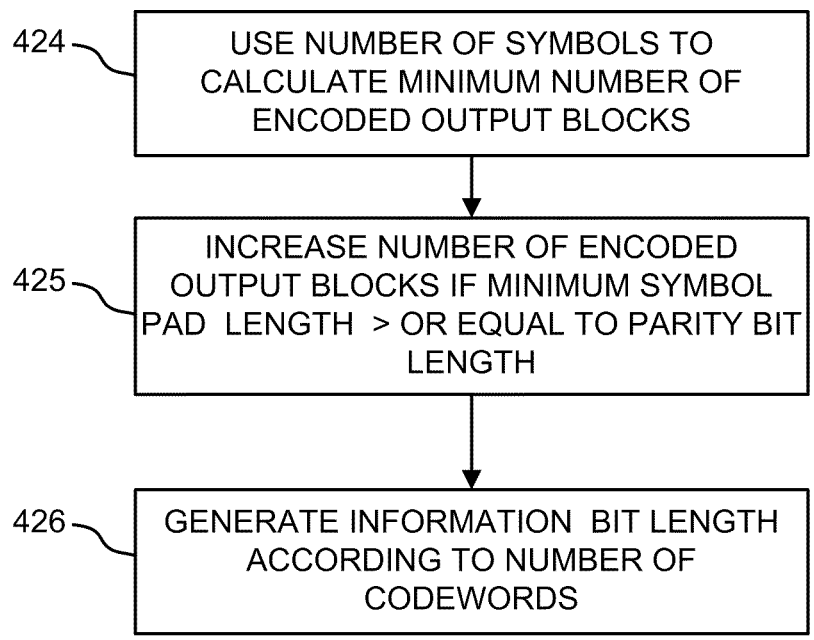
FIG. 8 illustrates method of determining a new coding scheme from a default coding scheme in the event that a receiving network device does not know the MAC frame length, in accordance with an embodiment of the disclosed method and apparatus.

FIG. 8 illustrates method of determining a new coding scheme from a default coding scheme in the event that a receiving network device does not know the MAC frame length, in accordance with an embodiment of the disclosed method and apparatus. In this embodiment, although the receiver does not know the MAC frame length, it does know the default coding scheme length, the default maximum information bit length of the default coding scheme, the bit loading per symbol, and the number of OFDM symbols used for the data transmission. Accordingly, in step (STEP 424), the transmitter and the receiver can calculate the new coding scheme by using the number of OFDM symbols to calculate the minimum number of encoded output blocks for the MAC frame that would result from using the default coding scheme. In the particular LDPC example described above, this minimum number of encoded output blocks B$_{min}$ may be computed as follows:

$$B_{min} = \left\lfloor \frac{N_{sym} \times N_{BAS}}{kLDPC_{max} + Nparity} \right\rfloor$$

where N$_{BAS}$ is the number of bits per OFDM symbol, Nparity is the number of parity bits in the LDPC mother code and kLDPC$_{max}$ is the default information bit length of the default coding scheme, which in this example is a link-specific maximum information bit length.

In STEP 425, the receiver and transmitter may determine if a payload capacity value comprising a remainder length is at least as great as the parity bit length of the default coding scheme. In the illustrated embodiment, the remainder length may comprise the total number of bits encodable using the scheduled number of OFDM symbols minus the calculated minimum number of encoded output blocks times the default encoded output block length. If this remainder length is at least as great as the parity bit length, then transmitter can safely use a new coding scheme having an additional encoded output block as compared to the minimum number of encoded output blocks using the default coding scheme calculated in STEP 424. In the particular LDPC example described above, the new number of encoded output blocks B$_{LDPC}$ may be calculated follows:

$$B_{LDPC} = B_{min} + \begin{cases} 0 & N_{sym} \times N_{BAS} - B_{min} \times (kLDPC_{max} + Nparity) < Nparity \\ 1 & \text{otherwise} \end{cases}$$

$$B_{LDPC} = \min(B_{LDPC}, N_{sym})$$

where the equation B$_{LDPC}$=min(B$_{LDPC}$, N$_{sym}$) refers to the constraint that the encoded output block duration is no less than symbol duration. Accordingly, in this example, the number of encoded output blocks is not increased beyond the number of OFDM symbols.

In the illustrated embodiment, in STEP 426 the calculated number of encoded output blocks is used to generate a new information bit length for encoded output blocks of the new coding scheme. As described above with respect to FIG. 7, in some embodiments, the last encoded output block may be generated using a modified information bit length. For example, in the LDPC example, a target information bit length, kLDPC$_{target}$, for all but the last encoded output block is generated as follows:

$$kLDPC_{target} = \left\lceil \frac{N_{sym} \times N_{BAS}}{B_{LDPC}} \right\rceil$$

In this example, the target information bit length, kLDPC$_{target}$, is used to generate the information bit length kLDPC for the new coding scheme subject to the constraints discussed above.

$$kLDPC = \begin{cases} kLDPC_{max} & \text{if } kLDPC_{target} > kLDPC_{max} \\ N_{BAS} - Nparity & \text{if } kLDPC_{target} + Nparity < N_{BAS} \\ kLDPC_{target} & \text{otherwise} \end{cases}$$

$$nLDPC = kLDPC + Nparity$$

where, nLDPC is the encoded output block length of the new coding scheme. In this example, a second new coding scheme may be generated for the last encoded output block in the MAC frame. This new coding scheme may be described as a (kLDPC$_{last}$,nLDPC$_{last}$) code, where kLDPC$_{last}$ and nLDPC$_{last}$ are computed as follows:

$$Imax = \begin{cases} \lfloor B_{LDPC} \times kLDPC/8 \rfloor & \text{if } N_{sym} \times N_{BAS} - \\ & B_{LDPC} \times nLDPC \geq 0 \\ \lfloor (N_{sym} \times N_{BAS} - Nparity \times B_{LDPC})/8 \rfloor & \text{otherwise} \end{cases}$$

$$kLDPC_{last} = 8 \times Imax - (B_{LDPC} - 1) \times kLDPC$$

$$nLDPC_{last} = kLDPC_{last} + Nparity$$

where Imax is the total number of information bits which may be encoded.

After the new coding scheme is generated, the transmitter may generate the required pads to encode and modulate the signal. In the LDPC example above, this may comprise computing the number of FEC pad bytes and the number of OFDM pad bytes as follows.

$$M_{FECpad} = Imax - M$$

$$N_{OFDMpad} = \lceil (N_{sym} \times N_{BAS} - (B_{LDPC} - 1) \times nLDPC - nLDPC_{last})/8 \rceil$$

This information may then be used to assemble the PHY payload comprising an encoded and padded MAC frame. Accordingly, after the PHY payload is transmitted to the receiving device, the receiving device may use its calculations of the information bit length of the new coding scheme to decode the MAC frame.

Figure 9:
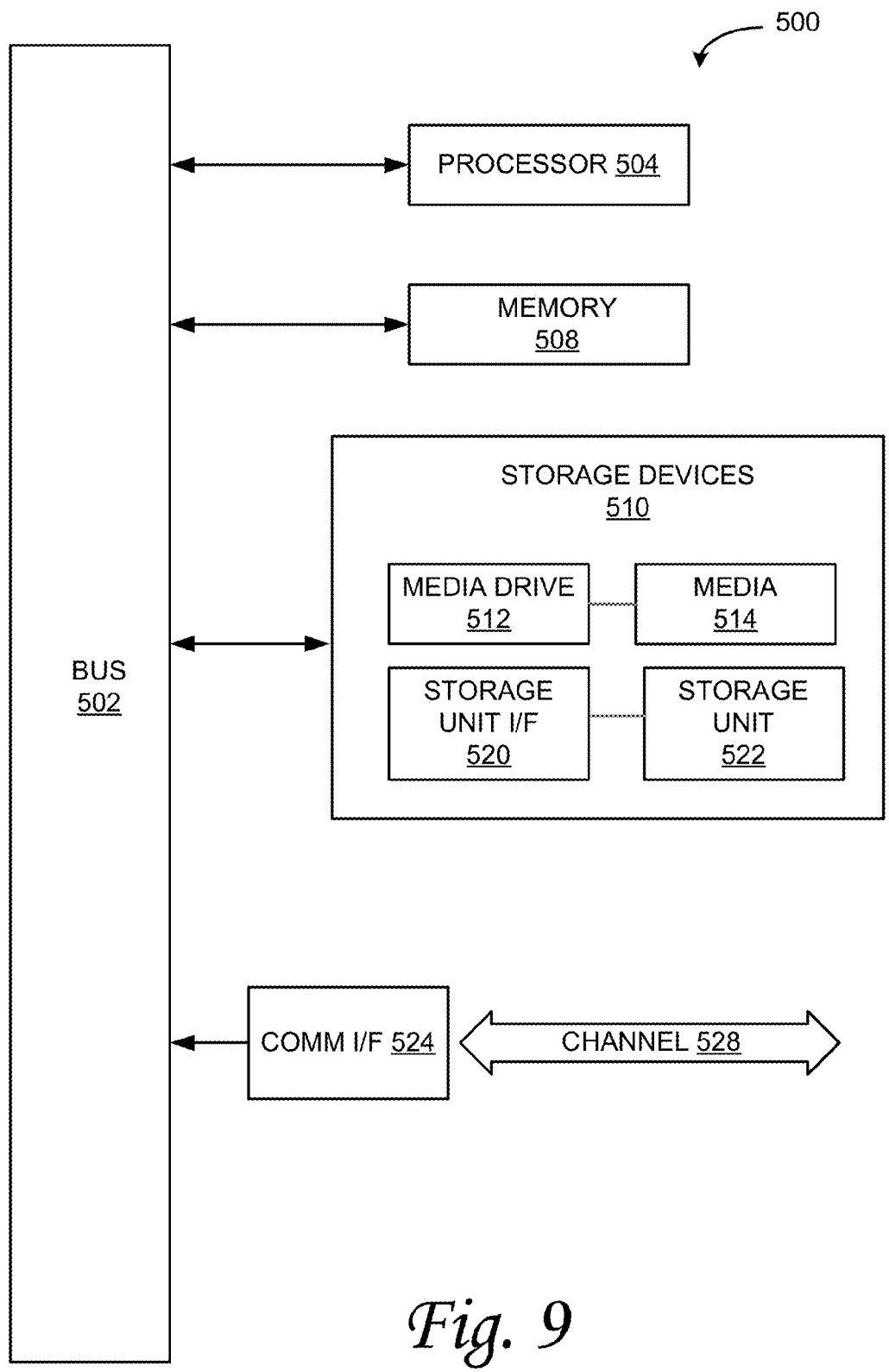
FIG. 9 illustrates an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 500. After reading this description, it will become apparent to a person skilled in the relevant art how to implement the disclosed method and apparatus using other computing modules or architectures.

Referring now to FIG. 9, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

The invention claimed is:

1. A method for a transmitting network device to encode data for transmission on a network link to a receiving network device, comprising:
   obtaining a media access control (MAC) frame scheduled for a physical layer (PHY) payload transmission and having a MAC frame length, wherein the PHY payload comprises a number of symbols;
   obtaining a default forward error correction (FEC) coding scheme for the network link, the default FEC coding scheme having a default parity length;
   calculating a payload capacity value for the PHY payload using characteristics of the default coding scheme;
   if the payload capacity value is at least as great as the default parity length, determining a new FEC coding scheme that maintains the number of orthogonal frequency division multiplexing (OFDM) symbols and is configured such that a symbol pad length for the PHY payload using the new FEC coding scheme is less than a default symbol pad length for the PHY payload using the default FEC coding scheme; and
   encoding the MAC frame using the new FEC coding scheme.

2. The method of claim 1, wherein a new encoded output block of the new FEC coding scheme has a parity length equal to the default parity length, and an information bit length less than the default information bit length.

3. The method of claim 1, wherein the MAC frame length is known to the receiving device before transmission;
   wherein the payload capacity value comprises the default symbol pad length; and
   wherein the new FEC coding scheme is configured such that the reduced symbol pad length is less than or equal to the default parity length.

4. The method of claim 3, wherein the step of determining the new FEC coding scheme comprises:
   computing a default number of FEC encoded output blocks to encode the MAC frame using the default FEC coding scheme;
   determining an additional encoded output block number equal to an integer that is less than the default symbol pad length divided by the default parity length; and
   determining the new FEC such that the new FEC coding scheme encodes the MAC frame using a number of encoded output blocks equal to the default number of FEC encoded output blocks plus the additional encoded output block number.

5. The method of claim 1, wherein the MAC frame length is not known to the receiving device before transmission;
   wherein the payload capacity value comprises a bit length of a remainder value, wherein the remainder value comprises a difference equal to a total number of bits in the PHY payload minus a minimum number of default encoded output blocks multiplied by the default encoded output block length; and
   wherein the new FEC coding scheme is configured such that the number of encoded output blocks of the new FEC coding scheme used to encode the MAC frame is one greater than the number of encoded output blocks of the default FEC coding scheme that would be used to encode the MAC frame.

6. A method for a receiving network device to decode data transmitted on a network link from a transmitted network device, comprising:
   obtaining an encoded media access control (MAC) frame modulated onto a physical layer (PHY) payload comprising a number of orthogonal frequency division multiplexing (OFDM) symbols;
   obtaining a default forward error correction (FEC) coding scheme for the network link, the default FEC coding scheme having a default parity length;
   calculating a payload capacity value for the PHY payload using characteristics of the default coding scheme;
   if the payload capacity value is at least as great as the default parity length, determining a new FEC coding scheme that maintains the number of OFDM symbols and is configured such that a symbol pad length for the PHY payload using the new FEC coding scheme is less than a default symbol pad length for the PHY payload using the default FEC coding scheme; and
   decoding the encoded MAC frame using the new FEC coding scheme.

7. The method of claim 6, wherein a new encoded output block of the new FEC coding scheme has a parity length equal to the default parity length, and an information bit length less than the default information bit length.

8. The method of claim 6, wherein an uncoded MAC frame length of the encoded MAC frame is known to the receiving device before transmission;
wherein the payload capacity value comprises the default symbol pad length; and
wherein the new FEC coding scheme is configured such that the reduced symbol pad length is less than or equal to the default parity length.

9. The method of claim 8, wherein the step of determining the new FEC coding scheme comprises:
computing a default number of FEC encoded output blocks to encode a bit stream having a length equal to the uncoded MAC frame length using the default FEC coding scheme;
determining an additional encoded output block number less than or equal to the greatest integer that is less than the default symbol pad length divided by the default parity length; and
determining the new FEC coding scheme such that the new FEC coding scheme is capable of encoding the bit stream using a number of encoded output blocks equal to the default number of FEC encoded output blocks plus the additional encoded output block number.

10. The method of claim 6, wherein the MAC frame length is not known to the receiving device before transmission;
wherein the payload capacity value comprises a bit length of a remainder value, wherein the remainder value comprises a difference equal to a total number of bits in the PHY payload minus a minimum number of default encoded output blocks multiplied by the default encoded output block length; and
wherein the new FEC coding scheme is configured such that the number of s of the new FEC coding scheme used to decode the MAC frame is one greater than the number of encoded output blocks of the default FEC coding scheme that would be required to decode the MAC frame.

11. A network device comprising a non-transitory machine-readable storage medium, the computer readable medium having a computer executable code embodied therein for enabling the network device to encode data for transmission on a network link to a receiving network device, the encoding comprising:
obtaining a media access control (MAC) frame scheduled for in a physical layer (PHY) payload transmission and having a MAC frame length, wherein the PHY payload comprises a number of orthogonal frequency division multiplexing (OFDM) symbols;
obtaining a default forward error correction (FEC) coding scheme for the network link, the default FEC coding scheme having a default parity length;
calculating a payload capacity value for the PHY payload using characteristics of the default coding scheme;
if the payload capacity value is at least as great as the default parity length, determining a new FEC coding scheme that maintains the number of OFDM symbols and is configured such that a symbol pad length for the PHY payload using the new FEC coding scheme is less than a default symbol pad length for the PHY payload using the default FEC coding scheme; and
encoding the MAC frame using the new FEC coding scheme.

12. The apparatus of claim 11, wherein a new encoded output block of the new FEC coding scheme has a parity length equal to the default parity length, and an information hit length less than the default information hit length.

13. The apparatus of claim 1 wherein the MAC frame length is known to the receiving device before transmission;
wherein the payload capacity value comprises the default symbol pad length; and
wherein the new FEC coding scheme is configured such that the reduced symbol pad length is less than or equal to the default parity length.

14. The apparatus of claim 13, wherein the step of determining the new FEC coding scheme comprises:
computing a default number of FEC encoded output blocks to encode the MAC frame using the default FEC coding scheme;
determining an additional encoded output block number equal to an integer that is less than the default symbol pad length divided by the default parity length; and
determining the new FEC such that the new FEC coding scheme encodes the MAC frame using a number of encoded output blocks equal to the default number of FEC encoded output blocks plus the additional encoded output block number.

15. The apparatus of claim 14, wherein the MAC frame length is not known to the receiving device before transmission;
wherein the payload capacity value comprises a bit length of a remainder value, wherein the remainder value comprises a difference equal to a total number of bits in the PHY payload minus a minimum number of default encoded output blocks multiplied by the default encoded output block length; and
wherein the new FEC coding scheme is configured such that the number of encoded output blocks of the new FEC coding scheme used to encode the MAC frame is one greater than the number of encoded output blocks of the default FEC coding scheme that would be used to encode the MAC frame.

16. A network device comprising a non-transitory machine-readable storage medium, the computer readable medium having a computer executable code embodied therein for enabling the network device to decode data transmitted on a network link from a transmitted network device, the decoding comprising:
obtaining an encoded media access control (MAC) frame modulated onto a physical layer (PHY) payload comprising a number of orthogonal frequency division multiplexing (OFDM) symbols;
obtaining a default forward error correction (FEC) coding scheme for the network link, the default FEC coding scheme having a default parity length;
calculating a payload capacity value for the PHY payload using characteristics of the default coding scheme;
if the payload capacity value is at least as great as the default parity length, determining a new FEC coding scheme that maintains the number of OFDM symbols and is configured such that a symbol pad length for the PHY payload using the new FEC coding scheme is less than a default symbol pad length for the PHY payload using the default FEC coding scheme; and
decoding the encoded MAC frame using the new FEC coding scheme.

17. The apparatus of claim 16, wherein a new encoded output block of the new FEC coding scheme has a parity length equal to the default parity length, and an information bit length less than the default information hit length.

18. The apparatus of claim 16, wherein an uncoded MAC frame length of the encoded MAC frame is known to the receiving device before;

wherein the payload capacity value comprises the default symbol pad length; and wherein the new FEC coding scheme is configured such that the reduced symbol pad length is less than or equal to the default parity length.

19. The apparatus of claim 18, wherein the step of determining the new FEC coding scheme comprises:

computing a default number of FEC encoded output blocks to encode a bit stream having a length equal to the uncoded MAC frame length using the default FEC coding scheme;

determining an additional encoded output block number less than or equal to the greatest integer that is less than the default symbol pad length divided by the default parity length; and determining the new FEC coding scheme such that the new FEC coding scheme is capable of encoding the bit stream using a number of encoded output blocks equal to the default number of FEC encoded output blocks plus the additional encoded output block number.

20. The apparatus of claim 16, wherein the MAC frame length is not known to the receiving device before transmission;

wherein the payload capacity value comprises a bit length of a remainder value, wherein the remainder value comprises a difference equal to a total number of bits in the PHY payload minus a minimum number of default encoded output blocks multiplied by the default encoded output block length; and wherein the new FEC coding scheme is configured such that the number of encoded output blocks of the new FEC coding scheme used to decode the MAC frame is one greater than the number of encoded output blocks of the default FEC coding scheme that would be required to decode the MAC frame.

* * * * *